(12) United States Patent
Wertenberger et al.

(10) Patent No.: US 11,007,648 B2
(45) Date of Patent: May 18, 2021

(54) ROBOTIC SYSTEM FOR GRASPING OBJECTS

(71) Applicant: ABB Schweiz AG, Baden (CH)

(72) Inventors: Steven Wertenberger, Auburn Hills, MI (US); Thomas Watson, Auburn Hills, MI (US); Matthew Sallee, Auburn Hills, MI (US)

(73) Assignee: ABB Schweiz AG, Baden (CH)

( * ) Notice: Subject to any disclaimer, the term of this patent is extended or adjusted under 35 U.S.C. 154(b) by 345 days.

(21) Appl. No.: 16/120,953

(22) Filed: Sep. 4, 2018

(65) Prior Publication Data

US 2019/0070734 A1 Mar. 7, 2019

Related U.S. Application Data

(60) Provisional application No. 62/554,342, filed on Sep. 5, 2017, provisional application No. 62/554,371, filed on Sep. 5, 2017, provisional application No. 62/554,383, filed on Sep. 5, 2017.

(51) Int. Cl.
*B25J 9/16* (2006.01)
*B65G 47/52* (2006.01)
*B25J 15/06* (2006.01)
*B25J 9/00* (2006.01)

(52) U.S. Cl.
CPC .......... *B25J 9/1697* (2013.01); *B25J 9/0093* (2013.01); *B25J 9/1628* (2013.01); *B25J 9/1676* (2013.01); *B25J 15/0616* (2013.01); *B65G 47/52* (2013.01)

(58) Field of Classification Search
CPC ....... B25J 9/1697; B25J 9/1628; B65G 47/52; G05B 2219/40053; G05B 2219/40425
See application file for complete search history.

(56) References Cited

U.S. PATENT DOCUMENTS

| | | | |
|---|---|---|---|
| 7,313,464 B1 * | 12/2007 | Perreault | B25J 9/1666 318/568.1 |
| 9,811,074 B1 * | 11/2017 | Aichele | G06N 7/04 |
| 10,800,040 B1 * | 10/2020 | Beckman | B25J 9/1605 |
| 2002/0067984 A1 | 6/2002 | Guenzi et al. | |
| 2004/0165980 A1 | 8/2004 | Huang et al. | |
| 2010/0170201 A1 | 7/2010 | Aquarius | |
| 2011/0098859 A1 * | 4/2011 | Irie | B25J 9/1697 700/259 |
| 2011/0167771 A1 | 7/2011 | Till et al. | |
| 2012/0096808 A1 | 4/2012 | Poutot et al. | |
| 2013/0200912 A1 * | 8/2013 | Panagas | G01R 1/0441 324/756.01 |
| 2013/0238124 A1 * | 9/2013 | Suzuki | B25J 9/1697 700/250 |
| 2016/0089791 A1 * | 3/2016 | Bradski | B25J 9/1612 700/214 |
| 2016/0167227 A1 * | 6/2016 | Wellman | B25J 9/1612 700/259 |
| 2017/0088360 A1 | 3/2017 | Brazeau et al. | |
| 2018/0118476 A1 | 5/2018 | Bastian, II et al. | |

(Continued)

*Primary Examiner* — Ryan Rink
(74) *Attorney, Agent, or Firm* — Taft Stettinus & Holliser LLP (57) ABSTRACT

A method is provided for grasping randomly sized and randomly located objects. The method may include assigning a score associated with the likelihood of successfully grasping an object. Other features of the method may include orientation of the end effector, a reachability check, and crash recovery.

20 Claims, 8 Drawing Sheets

(56) References Cited

U.S. PATENT DOCUMENTS

| | | |
|---|---|---|
| 2018/0141211 A1 | 5/2018 | Wellman et al. |
| 2018/0155142 A1 | 6/2018 | Worsley et al. |
| 2019/0070734 A1* | 3/2019 | Wertenberger ........ B25J 9/1697 |
| 2020/0078941 A1* | 3/2020 | Oka ........................ B25J 9/1666 |
| 2020/0094406 A1* | 3/2020 | Kusano .................. B25J 9/1669 |
| 2020/0095001 A1* | 3/2020 | Menon ...................... B65B 5/12 |

* cited by examiner

ROBOTIC SYSTEM FOR GRASPING OBJECTS

BACKGROUND

The present inventions relate generally to robots, and more particularly, to a system of grasping an object from an area containing multiple objects.

Robots are used to perform a variety of tasks in high volume, repetitive applications. Commonly, robots are used in highly controlled environments where there is limited variability in the workspace. That is, each of the objects that a robot interacts with often has a predefined shape and size. The objects are also typically presented to the robot in a predefined location and orientation. Thus, the algorithm employed by the robot involves repetitive movements and actions that involve minimal variation.

However, there may be a desire to use robots in work environments with greater variation in the types of objects encountered by a robot. Methods to expand the environments in which robots can be used would be desirable for a number of applications.

SUMMARY

A method is described for grasping objects, such as shipping packages. The objects may have random sizes and may be randomly located. The method may include scoring objects for the likelihood of successfully grasping the object, orienting the end effector to the object, checking reachability, and crash recovery.

BRIEF DESCRIPTION OF SEVERAL VIEWS OF THE DRAWINGS

The invention may be more fully understood by reading the following description in conjunction with the drawings, in which.

DETAILED DESCRIPTION

One application in which robots may be used involves sorting objects of mixed sizes, mixed orientations, and/or multiple objects that are mixed together. For example, in one possible application, objects may be delivered to the robot by an infeed conveyor. The objects may then be loaded into sorting bins from the infeed conveyor if desired. Although the objects may be various types of objects, one preferred application involves shipping packages. In the case of shipping packages, the incoming stream of packages may contain randomly sized packages that are mixed together. The mix of packages may also have random orientations relative to each other and the infeed conveyor and/or sorting bins. The packages may also be partially stacked on top of each other.

In the sorting application, the robot is tasked with grasping objects from the incoming stream and placing the objects in an outgoing stream. For example, where shipping packages are loaded into sorting bins, the robot grasps packages from the sorting bins and places them in an outfeed location, such as an outfeed conveyor. When placing objects in the outgoing stream, it is preferable for the robot to space the objects apart from each other so that subsequent systems can easily identify separate objects from each other. It is also preferable for the robot to place the objects in a predefined orientation. For example, in the case of shipping packages, it is preferred for packages to be placed with the shipping label facing up and aligned with each other with respect to an outfeed direction.

Figure 1A:
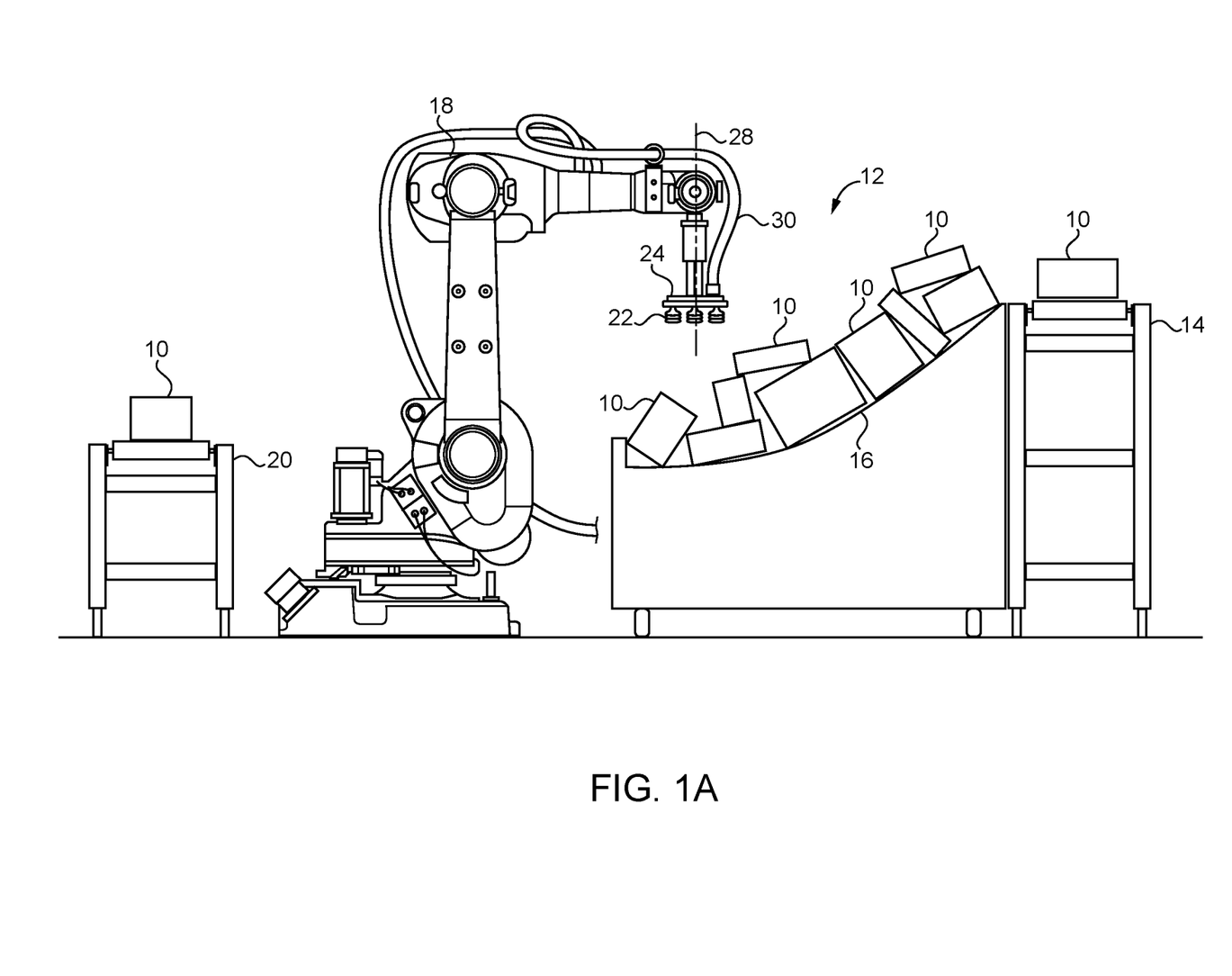
FIG. 1A is a side schematic view of a robotic sorting system.
Figure 1B:
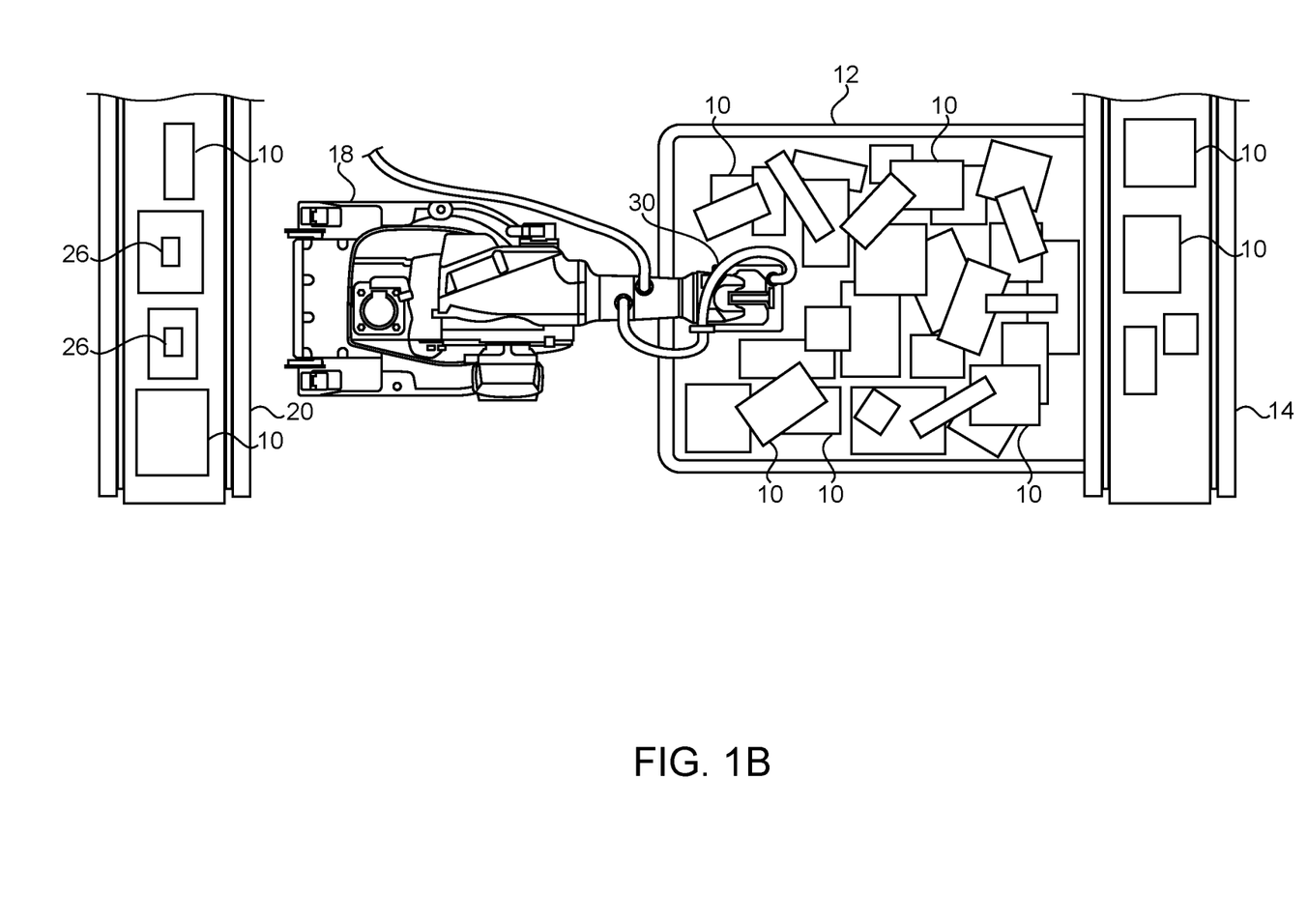
FIG. 1B is a top schematic view of a robotic sorting system.

An example of a robotic sorting system is shown in FIGS. 1A and 1B. As shown, shipping packages 10 (or other objects) are delivered to a sorting bin 12 by an infeed conveyor 14. The shipping packages 10 are then loaded into the sorting bin 12 from the infeed conveyor 14. This may occur with a guide or other mechanism that slides the packages 10 off the conveyor 14 into the sorting bin 12. Preferably, the sorting bin 12 is provided with a ramped surface 16 that causes the shipping packages 10 to slide down from the infeed conveyor 14 toward the robot 18. As shown in both FIGS. 1A and 1B, the shipping packages 10 have random sizes and shapes and are presented in random locations and/or orientations. That is, the packages 10 may be stacked on top of each other, may be upright, on their side, tilted, or in any reasonably conceivable orientation or location within the sorting bin 12. The shape and size of the shipping packages 10 are also only limited by the physical capacity of the robot 18 sorting system. Thus, the sizes, shapes, location and orientation of the shipping packages 10 are not predefined or known to the robot 18. Therefore, the robot 18 grasps and moves shipping packages 10 from the sorting bin 12 without regard to size, shape, location or orientation of the shipping packages 10.

During use, the robot 18 grasps shipping packages 10 from the sorting bin 12 and places the shipping packages 10 on an outfeed conveyor 20 (or other output station). As shown in FIG. 1B, the shipping packages 10 are preferably separated from each other on the outfeed conveyor 20. The shipping packages 10 are also preferably aligned with each other on the outfeed conveyor 20. That is, as shown in FIG. 1B, the short sides of the packages 10 all face in the direction of travel of the conveyor 20, with the long axis of each package 10 being parallel to the direction of travel.

Although the shipping packages 10 may be grasped by the robot 18 in various ways, it may be desirable to use vacuum cups 22 on the end effector 24 to grasp the packages 10 with minimal pressure and/or damage to the packages 10. Preferably, each package 10 as two opposing flat surfaces that are larger than surfaces of the edges of the package 10. The shipping packages 10 may be rectangular in shape if desired. In the shipping industry, the shipping label 26 is generally placed on one of the larger surfaces, as opposed to the smaller edge surfaces. It is thus desirable to place the packages 10 on the outfeed conveyor 20 with one of the larger surfaces facing up and resting on the opposing larger surface. Therefore, the robot 18 may use the vacuum cups 22 of the end effector 24 to grasp the larger surface of the packages 10 in the sorting bin 12. The robot 18 then moves the package 10 to the outfeed conveyor 20 and releases the vacuum cups 22 so that the engaged surface of the package 10 faces up on the outfeed conveyor 20. In this system, the robot 18 may ignore the shipping label 26 itself when grasping packages 10 from the sorting bin 12, which means that the label 26 may be either upright or upside down when placed on the outfeed conveyor 20. Therefore, it may be desirable to provide a flipping system at the outfeed conveyor 20 which inspects the packages 10 to determine if each package 10 has a shipping label 26 facing up. If a package 10 does not have an upward facing shipping label 26, it can then be assumed that the label 26 is on the underside of the package 10. Those packages 10 may then be flipped with various types of mechanisms so that the shipping label 26 faces up. Thus, after the flipping system, all of the packages 10 will have labels 26 that are facing up for further processing.

Figure 2:
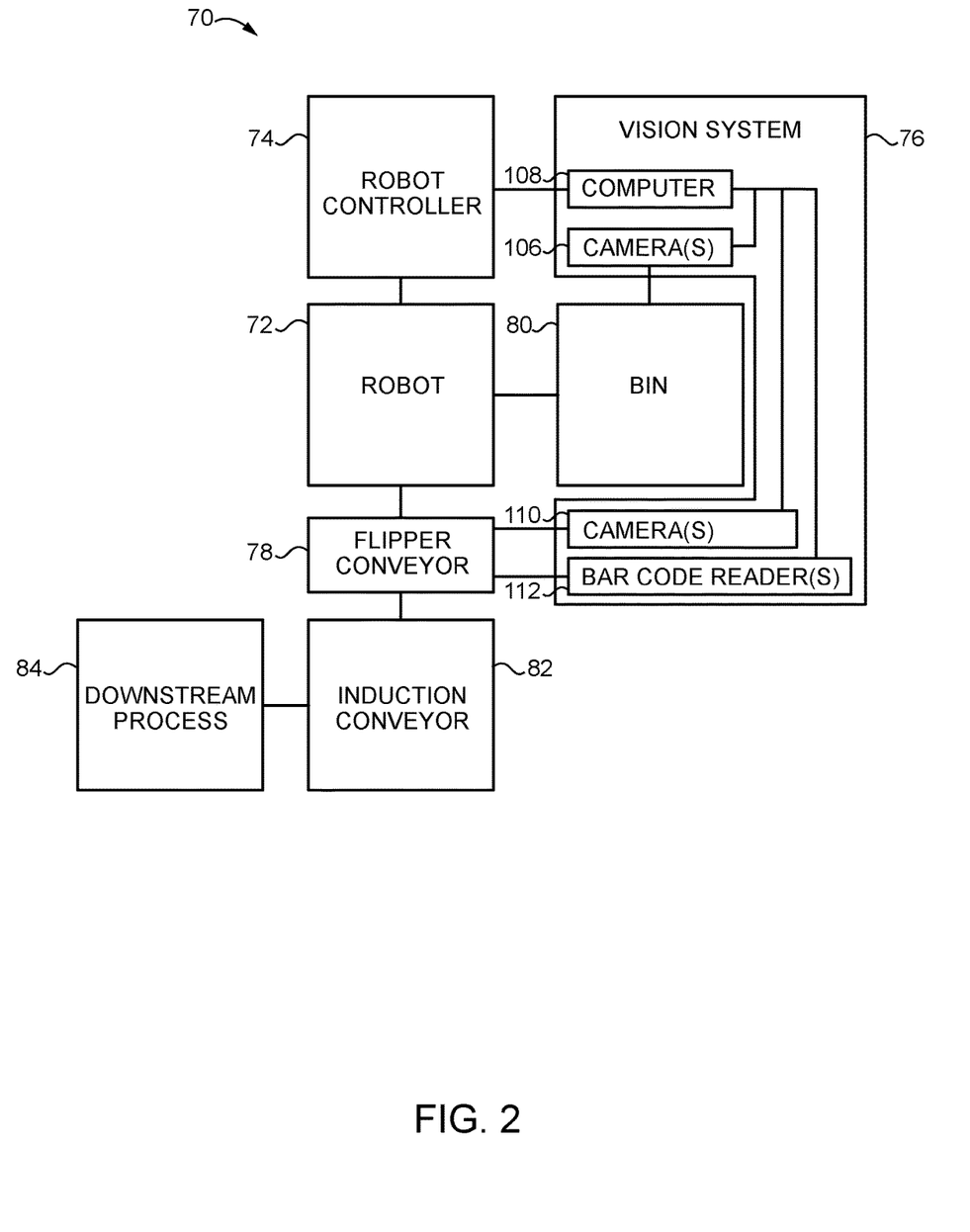
FIG. 2 is a block diagram of a robotic system for removing objects from a bin and placing the objects on a conveyor.

Referring to FIG. 2, another robotic system 70 is schematically depicted. Robotic system 70 includes a robot 72, a computer-based robotic controller 74, a robotic vision system 76 and a flipper conveyor system 78. In one form, robotic system 70 is operative to retrieve or pick objects, e.g., packages, parts or the like as described above and shown in FIGS. 1A and 1B, from a picking bin 80 and place the objects onto an outfeed conveyor, e.g., an induction conveyor 82, for induction into a downstream process 84. The objects are delivered to bin 80 randomly, e.g., by a supply or infeed conveyor 14, for picking by robotic system 70. The objects vary in size and shape. Also, the objects vary in orientation in the bin, e.g., due to the random nature of the delivery of the objects to the bin, due to the variations in the size and shape of the objects, and due to the fact that the objects may pile up on top of each other in bin 80 in a random manner.

Robot 72 is constructed to pick the objects up from bin 80 and to deposit the objects onto flipper conveyor system 78 under the direction of robotic controller 74. Flipper conveyor system 78 is operative, under the direction of robotic controller 74, to transfer the objects to induction conveyor 82 in the orientation as deposited by robot 72, or to flip the objects over and then transfer the objects in the flipped-over orientation to induction conveyor 82. For example, in some embodiments, once an object 104 is placed onto flipper conveyor system 78, a determination is made as to whether a particular feature, e.g., a bar code, is found on the top of the object after being placed onto flipper conveyor system 78. If so, flipper conveyor system 78 deposits the object onto induction conveyor 82 in the same orientation as the object was deposited onto flipper conveyor system 78. If not, flipper conveyor system 78 flips the object over and then deposits it onto induction conveyor 82. Induction conveyor 82 is operative to induct the object into a downstream process 84, e.g., to deliver the object to downstream process 84. A non-limiting example of a downstream process 84 is a mail/shipping processing or distribution system, although downstream process 84 may be any industrial, commercial or other process in other embodiments.

Figure 3:
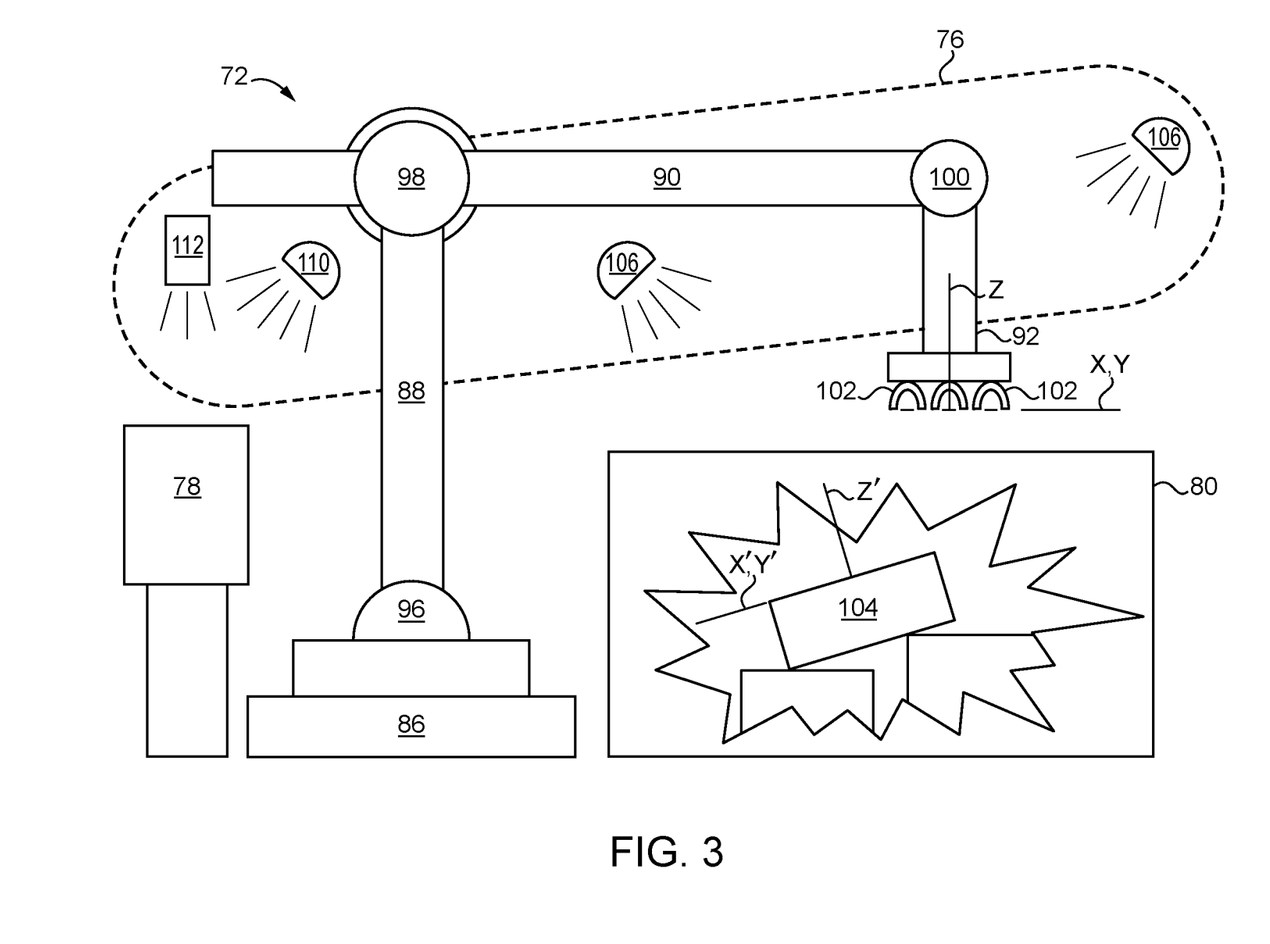
FIG. 3 is a schematic view of the system of FIG. 2.

Referring to FIG. 3, robot 72 includes a base 86, a lower arm 88, an upper arm 90 and an end effector 92, e.g., a gripper 94. In one form, robot 72 is a 6-axis robot. In other embodiments, robot 72 may have a greater or lesser number of axes. Lower arm 88 is coupled to base 86 via a shoulder joint system 96. Upper arm 90 is coupled to lower arm 88 via an elbow joint 98. End effector 92 is coupled to upper arm 90 via a wrist joint 100. In one form, end effector 92 is a gripper 94 in the form of a vacuum gripper having a plurality of vacuum powered suction cups 102 configured to pick up objects 104 from bin 80. In one form, the suction cups 102 are arranged in a 3×3 grid. In other embodiments, suction cups 102 may be arranged in other geometric orientations. The number of suction cups may vary with the needs of the application. In other embodiments, other forms of grippers or other types of end effectors may be employed. In one form, the bottoms of suction cups 102 form an XY plane of end effector 92.

At startup, an operator is asked to verify that picking bin 80 is clean and empty. Robot 72 is at a home position at startup. Before objects 104 are placed into bin 80, vision system 76 acquires a background image of bin 80, e.g., using one or more cameras 106, which are constructed to provide 3-dimensional image data, e.g., in the form of a point cloud. The number of cameras may vary with the needs of the application, and thus, various embodiments may have one or any other number of cameras. Cameras 106 may be two or more 2-dimensional cameras used in combination to provide 3-dimensional images, or may be one or more 3-dimensional cameras. The background image of bin 80 without any objects 104 in it is used for background subtraction, and helps to prevent stickers, labels, wear, scratches or other semi-permanent or permanent changes to bin 80 from being mistaken as objects 104. After startup, objects 104 are then randomly deposited into bin 80, e.g., via the infeed conveyor, for subsequent picking by robot 72. Robot 72 executes program instructions to request a target or a new target object from vision system 76, beginning the process of picking up a target object 104 from bin 80

In one form, prior to each pick by robot 72, computer 108 executes program instructions for vision system 76 to take an image, and to subtract the background image, yielding a modified image. In one form, computer 108 is considered a part of vision system 76. Computer 108 is in communication with controller 74. In other embodiments, computer 108 may be a separate computer, e.g., a stand-alone computer, or may be a computer associated with robotic system 72, e.g., may be part of controller 74. In some embodiments, vision system 76 may take a new image after completing a number of picks, followed by subtracting the background image from the new image.

After subtracting the background image, computer 108 executes program instructions to analyze the contents of bin 80 based on the modified image, e.g., prior to each pick. Computer 108 then executes program instructions to select or designate, e.g., randomly, a target object 104 in the bin from the modified image for picking by robot 72. Computer 108 next executes program instructions to analyze the target object 104, e.g., including to determine target data for the target object 104. The target data may include the X', Y' and Z' axes of the target object 104, e.g., of the top-most surface of the designated target object 104, and a score for the target object 104. In some embodiments, computer 108 may also execute program instructions to determine the orientation of the target object 104. Computer 108 provides or transmits the score and the other target data to controller 74.

The score may relate to, for example, a measure of confidence that vision system 76 has designated or selected a good target. For instance, the score may be based on the degree to which the target object has a well-defined surface or shape in the image, e.g., of a predetermined geometry, for example, a rectangular geometry. The score may also be based on a measure of confidence as to how well vision system 76 determined the X', Y' and Z' axes of the target object 104. This may include analyzing as to whether vision system 76 can determine the X'Y' plane that a planar or non-planar surface of the target object 104, e.g., the X'Y' plane of a rectangular object's flat or irregular surface. The score may also be based on a measure of confidence as to how well vision system 76 correctly or accurately determined the orientation of the surface, e.g., as indicated by roll or rotation about X, Y and Z axes in an object, target or other coordinate system.

If the score is greater than a predetermined score value, e.g., 50 on a scale of 0-100, or 50%, computer 108 executes program instructions to designate the target object 104 for potential picking from bin 80. Vision system 76 provides, e.g., transmits, target data for the target object 104 to controller 74. In some embodiments, the target data includes the score, and the X, Y and Z axis data for the target object 104, i.e., the X', Y' and Z' axis data for the target object, in preparation for picking the target object 104 from the bin. In some embodiments, vision system 76 also provides orientation data for the target object to controller 74. Before the target is picked up by robot 72, controller 74 executes program instructions to perform a reachability check or determination, e.g., as described herein below. In some embodiments, the reachability check is performed based on the coordinate data for the target object. If the target object 104 passes the reachability check, controller 74 executes program instructions to pick the target object from bin 80 and deposit the target object on flipper conveyor system 78. If the target 104 does not pass the reachability check, controller 74 executes program instructions to request another object 104, e.g., a new target object 104, from vision system 76, and the process of analyzing and scoring the new target object 104 is repeated.

Computer 108 may also execute program instructions to determine if the object is on its side, for example, by determining whether the length of the observed Z-axis dimension of the target object 104 is greater than the lengths of the observed X and Y dimensions of the target object. If the observed Z-axis or vertical dimensional component of the object is greater than the observed X and Y axis or horizontal dimensional components of the object, the target object 104 is determined to be on its side. In some embodiments, robotic system 72 preferably picks objects 104 by gripping the objects 104 on the object 104 X'Y' plane, which is more readily done when the X'Y' plane of the object is not vertical, and more preferably is horizontal or within some desired angle of the horizontal.

If the target object 104 is on its side, a reachability check is also performed. If the target 104 does not pass the reachability check, controller 74 executes program instructions to request another object 104, e.g., a new target object 104, from vision system 76, and the process of analyzing and scoring the new target object 104 is repeated. Otherwise, if the target object 104 passes the reachability check, robot controller 74 executes program instructions to pick up the target object 104 and move or toss it to change its orientation, e.g., so that it is no longer resting on its side or no longer resting predominantly on its side. For example, the move or toss is performed to make the object 104 land or come to rest predominantly on the surface having the largest dimensions or area or surface, e.g., a top or bottom surface.

If the score is less than 50%, another, e.g., new, target object 104 is designated, e.g., randomly, and the process of analyzing and scoring the new target object 104 is repeated. In some embodiments, a new image of bin 80 with objects 104 disposed therein is taken (and the background subtracted) after determining a score of less than 50% for a previous target object and prior to designating another, new, potential target object. In other embodiments, the same image may be used as was used for the previous target object.

If the score is less than 50% a predetermined number, N, of times, in a row, i.e., for N different designated target objects in a row, controller 74 executes program instructions to perform a stir routine on the objects in bin 80, e.g., by stirring, shaking, agitating or tossing objects 104 about in bin 80. In one form, N=3. In other embodiments, N may be any value suitable for the particular application. If the stir routine includes tossing or moving the target object 104, controller 74 executes program instructions to perform a reachability check on the target object 104 prior to picking up the target object 104 for tossing.

Thus, if a target object 104 has a score of 50% or greater and if the target object 104 was not determined to be on its side, a reachability check or determination is performed. If the object passes the reachability check, i.e., is determined to be reachable, controller 74 executes program instructions to pick the target object 104 from bin 80, and deposit the target object onto flipper conveyor system 78. A vision system, e.g., vision system 76 then executes program instructions, e.g., using computer 108, to determine, using one or more cameras 110, whether more than one target object 104 was inadvertently picked from bin 80 and placed onto flipper conveyor system 78. In addition, one or more bar code readers 112 are used to determine whether a bar code is presented on the top of the target object 104 that is on flipper conveyor system 78. If so, flipper conveyor system 78 moves in one direction to deposit the target object 104 onto induction conveyor 82 in the same orientation as it was placed on flipper conveyor system 78. If not, flipper conveyor system 78 moves in another direction to flip the target object 104 over, and then deposits the flipped target object 104 onto induction conveyor 82.

Figure 4:
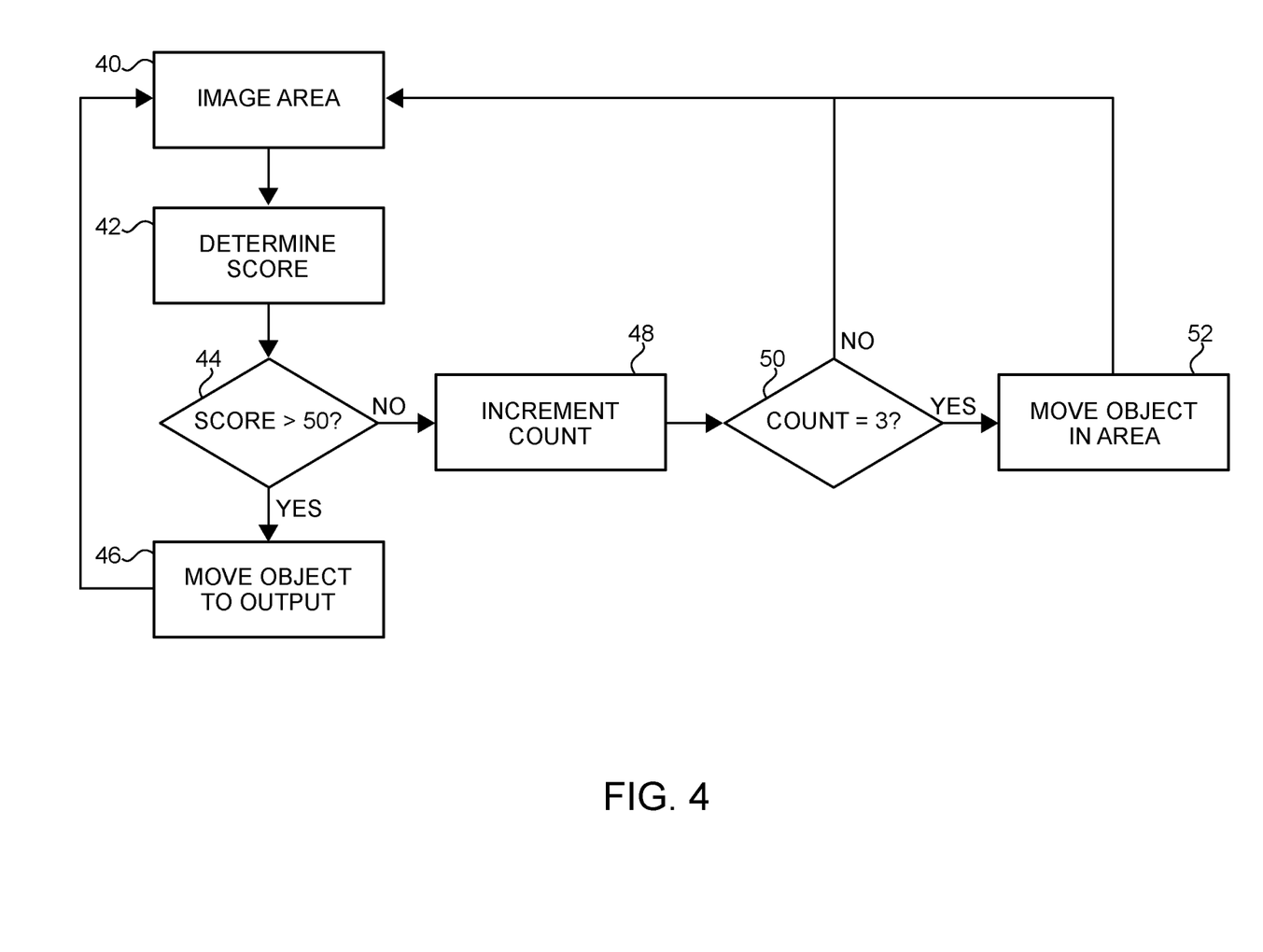
FIG. 4 is a flow chart of a method of grasping an object with a robot.

A method of grasping the shipping packages 10 is shown in FIG. 4. In the preferred method, an area of the sorting bin 12 is imaged to identify a possible package 10 to grasp and move. Because of the randomness of the shipping packages 10, it may not be possible to immediately identify and successfully grasp and move a package 10. Thus, an iterative method that permits the robot 18 to move packages 10 within the sorting bin 12 is preferred. In a first step, an area of the sorting bin 12 is imaged (40). Preferably, the imaging process includes capturing an initial image of the sorting bin 12 without any packages 10 therein. The initial image may then be subtracted from subsequently captured images in order to image the packages 10 alone without background interference from the sorting bin 12 and/or other equipment. It is understood that each time the sorting bin 12 is imaged (40) to identify potential targets 10 it may not be necessary to capture a new image of the sorting bin 12. That is, where the packages 10 are not expected to have moved between subsequent imaging steps, it may be possible for two or more imaging steps (40) to use the same captured image by reanalyzing the captured image for multiple imaging steps (40). However, it is also possible for new images to be captured with each imaging step (40) if desired.

In a second step, the robot looks for a potential target 10 (package 10) in the image to grasp and assigns a score to the potential target 10 (42). The score is determined based on the orientation of a package 10, obstructions (e.g., other packages), etc. For example, scores may be assigned within a range of 0-100 as a percentage likelihood that a particular package 10 will be successfully grasped. Preferably, the score specifically corresponds to the likelihood that the largest surface of a package 10 is graspable in contrast to one of the edge surfaces (i.e., the surface with the shipping label 26 or the surface opposite of the shipping label 26). If the score is high enough (44), the robot 18 moves to the package 10 and grasps the package 10 (46). The robot 18 then moves the package 10 to the outfeed conveyor 20 (46). In one example, a threshold score of 50 may be used, such that the robot 18 attempts to grasp and move the package 10 to the outfeed conveyor 20 if the score is higher than 50.

Figure 5:
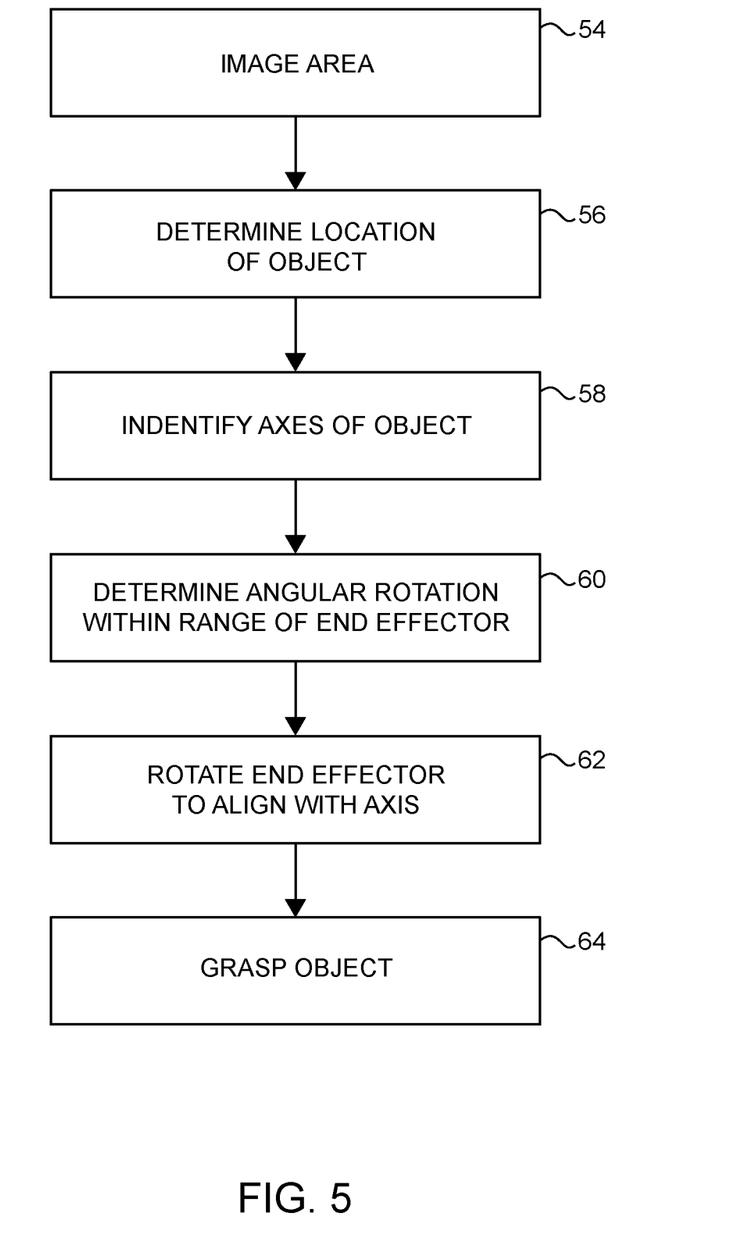
FIG. 5 is a flow chart of a method of orienting a robot.
Figure 6:
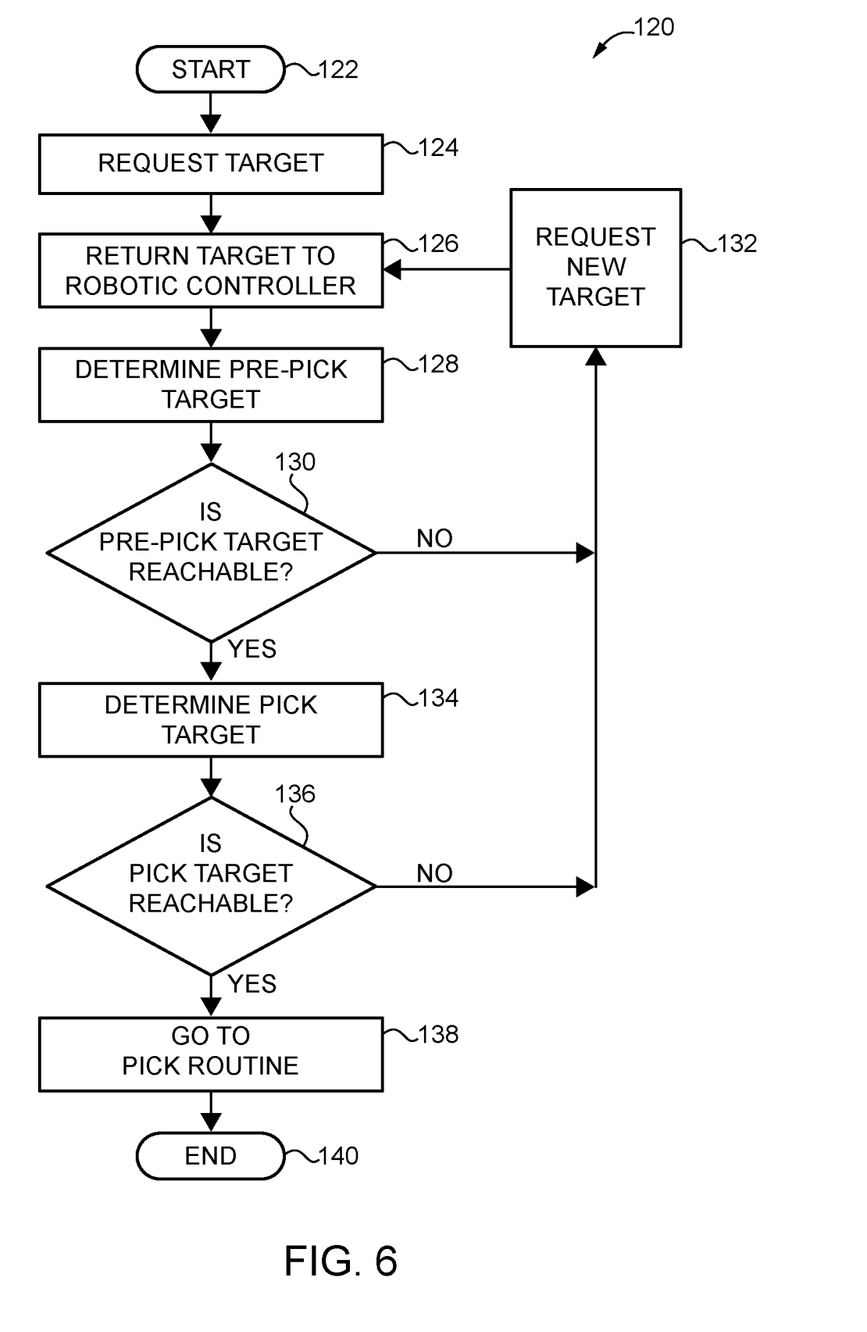
FIG. 6 is a flow chart of a method of checking reachability of a target.
Figure 7:
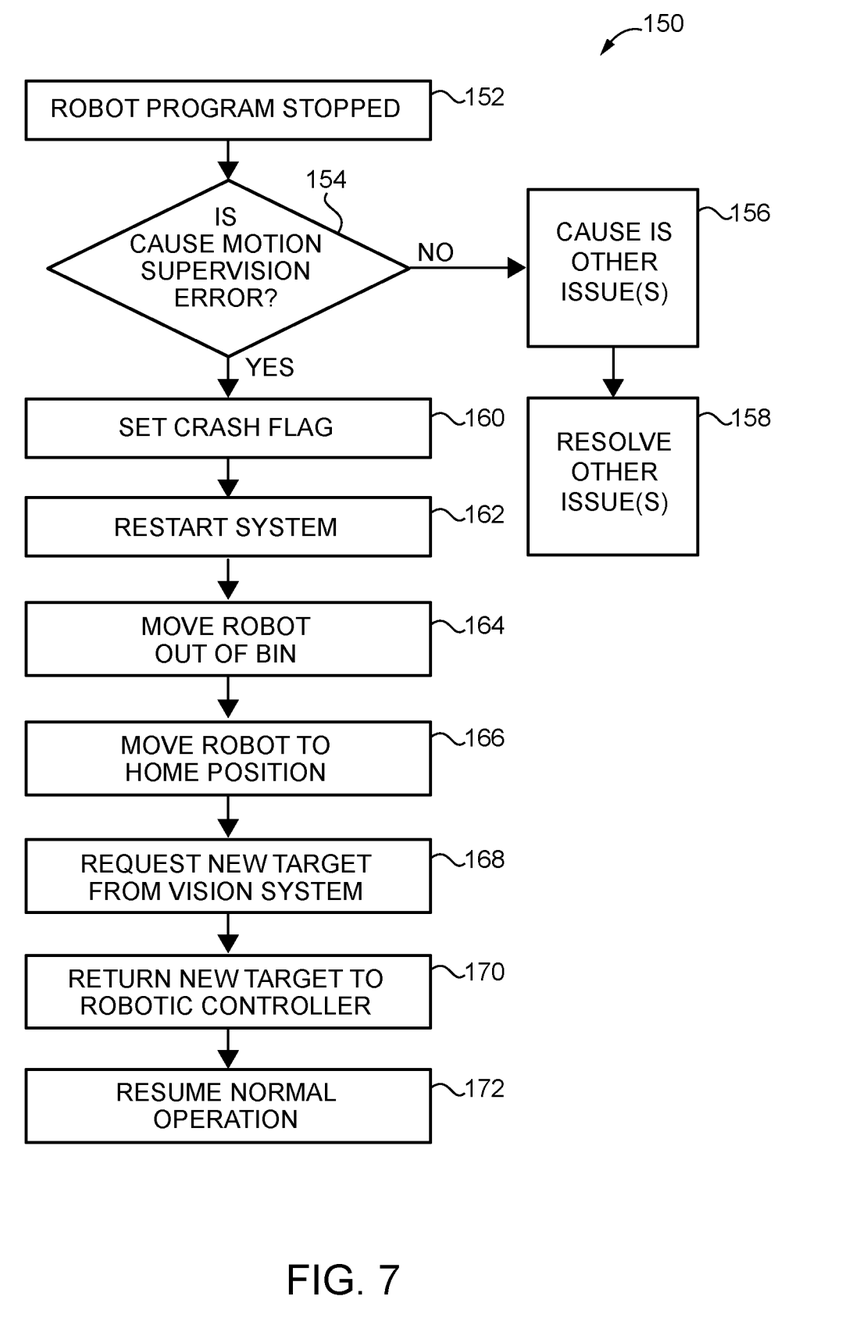
FIG. 7 is a flow chart of a method of robotic crash recovery.

It is noted, however, that other conditions and functions may be employed in grasping the package 10. For example, it may be desirable to orient the end effector 24 to the package 10 as shown in FIG. 5 and described below. The robot 18 may also perform a check of whether the package is reachable by the end effector 24 as shown in FIG. 6 and described below (i.e., that the end effector 24 can be aligned with the package 10). Due to the random orientation and location of the packages 10 and the constant movement of packages 10 in the sorting bin 12, there is also the possibility that the robot 18 will encounter physical interference (e.g., a crash) when attempting to grasp a package 10 as shown in FIG. 7 and described below. Such conditions may prevent actually grasping an intended package 10 in some situations.

If the determined score is below the threshold (44), the robot 18 does not attempt to grasp and move the package to the outfeed conveyor 20. Instead, the robot 18 repeats (48) the imaging (40) and scoring steps (42) to target a new potential package 10. Preferably, the second area that is imaged is different from the first area that was imaged. However, it is possible that the two areas are the same, with a different package 10 being targeted in the area. It is understood that the imaging (40) and scoring (42) steps may involve imaging (40) the entire sorting bin 12 at each imaging step (40), and the scoring step (42) may involve identifying a potential target 10 within the sorting bin 12 with the highest score. After the second area is scored, the robot 18 grasps and moves the second potential package 10 to the outfeed conveyor 20 if the score is above the threshold (46). Preferably, the first and second thresholds are the same as each other (e.g., 50). If the second score is also less than the second threshold, the robot 18 repeats (48) the imaging (40) and scoring steps (42) again in a like manner as described above.

If the score is still below the threshold after the third (50) imaging (40) and scoring attempts (42), the packages 10 in the sorting bin 12 are moved to shuffle the packages 10 (52). Although in the preferred method, the packages 10 in the sorting bin 12 are moved (52) after three (50) imaging (40) and scoring (42) attempts, various numbers of attempts may be made before moving packages 10 in the sorting bin 12 (52). For example, it is possible to move (52) packages 10 in the sorting bin 12 after each failed imaging (40) and scoring (42) attempt, after two attempts, or after more than three attempts.

One way to move (52) the packages 10 within the sorting bin 12 is for the robot 18 to grasp the third package 10 even though the score was below the threshold. Because the package 10 to be moved has a low score (i.e., likelihood of being successfully grasped), it is preferable for the end effector 24 to approach the package 10 to be moved more slowly than when a package 10 has a higher score and is intended to be grasped and moved to the outfeed conveyor 20. However, instead of moving the package 10 to the outfeed conveyor 20, the robot 18 moves the package 10 to a different location in the sorting bin 12. In the case where the sorting bin 12 has a ramped surface 16, the robot 18 may move the end effector 24 and package 18 upward on the ramp 16, and release the package 10 at a higher height on the ramp 16 than where first grasped, which causes the package 10 to slide at least partially down the ramp 16 into the other packages 10. The other packages 10 may also slide partially down the ramp 16 in response to the robot 18 moving the package 10 in the sorting bin 12. It may also be preferable for the robot 18 to release the package 10 onto the ramp 16 with a tossing motion. That is, the robot 18 may release the package 10 before the package 10 is resting on the ramped surface 16 or another package 10. The package 10 may also be released as the robot 18 is moving the package 10 (e.g., by releasing the vacuum pressure to the vacuum cups 22) so that the package 10 has an angular momentum. Preferably, the speed of the end effector 24 may be accelerating when the package 10 is released. Because of the random sizes and shapes of the packages 10 (including different weights), the tossing motion results in random dropping of the packages 10 into new locations in the sorting bin 12.

After movement of the package 10 in the sorting bin 12, the arrangement of packages 10 in the sorting bin 12 has been changed from the previous imaging (40) and scoring (42) attempts. The method may then be repeated to continue identifying packages 10 to be moved to the outfeed conveyor 20.

A method of orienting the robot and grasping the shipping packages 10 is shown in FIG. 5. In the preferred method, an area of the sorting bin 12 is imaged to identify a package 10 to grasp and move (54). Preferably, the location of the package 10 is determined using the imaged surfaces of the package 10 (56). In order to ensure that the grasped package 10 can be placed on the outfeed conveyor 20 in an aligned orientation (i.e., aligned with the other packages 10 on the outfeed conveyor 20 and the direction of travel of the conveyor 20), it is necessary for the end effector 24 to be aligned with the package 10 when the package 10 is grasped. Preferably, the end effector 24 is aligned with the package 10 by rotating the end effector 24 around the axis 28 of the end effector 24.

However, in the preferred method, it is desirable to minimize rotation of the end effector 24 when aligning the end effector 24 with the package 10. This may be desirable to increase the grasping speed of the robot 18. It may also be desirable to minimize twisting of the vacuum hose 30 which supplies vacuum pressure to the vacuum cups 22 of the end effector 24. In order to minimize rotation of the end effector 24, the axes of the package 10 are identified to determine the orientation of the package 10 (58). For example, where the shipping package 10 is rectangular, one axis passes through the center of the package 10 and is parallel to the long side edges of the package 10. The other axis would be perpendicular to the first axis and parallel to the short side edges of the package 10. In this case, the imaged surface is preferably a flat surface of the package 10 that is larger than the edge surfaces (i.e., the surface with the shipping label 26 or the opposing surface).

After the axes have been identified, the end effector 24 could be rotated to align with either of the two possible axes. In addition, for each of the axes, the end effector 24 could be aligned with the axis by rotating in two different directions. For example, a particular package 10 may have an axis that passes between 130° and −50° and may have a perpendicular axis thereto that passes between −140° and 40°. Thus, in this case, the end effector 24 could rotate to any of four possible angular rotations (i.e., 40°, −50°, 130°, −140°) to align with the package 10. However, in order to minimize rotation, the robot 10 selects the angular rotation of 40°, which is the one possible angular rotation that is equal to or less than 45° from the initial starting point of the end effector 24 (60). However, it is understood that the selected angular rotation (60) could be within another range, such as 15° or 75° of the initial starting point of the end effector 24. In some situations, it may be desirable to bypass a package 10 that does not have an axis within the predefined range, or to select one of multiple axis rotations that fall within the predefined range. Preferably, the selected angular rotation is always chosen from the original initial starting point of the end effector 24 so that the end effector 24 always remains within a total of 90° of the starting angular location.

Once the preferred angular rotation has been determined, the end effector 24 is rotated to the angular rotation (62), and the end effector 24 is moved toward the package 10. The vacuum cups 22 then grasp the package 10 as described above (64). The robot 18 may then move the package 10 to the outfeed conveyor 20.

Referring to FIG. 6, some aspects of a method 120 for operating a robot and for performing a reachability check or determination is illustrated. The reachability check is performed by controller 74.

Process flow begins at block 122. At block 124, a target object is requested by controller 74. At block 126, a target object or a new target object is returned to controller 74 from vision system 76, e.g., from computer 108. For example, the target object is obtained and received by controller 74 in response to the request at block 124 (or block 132). The target object 104 may be a target object having a score greater than 50% intended for placement onto flipper conveyor system 78. Alternatively the target object 104 may be a target object that was determined to be resting on its side or resting predominantly on its side, and is intended to be tossed in order to change its orientation, so that a pick may subsequently be performed to remove it from bin 80 and deposit it onto flipper conveyor system 78 on its top surface or bottom surface. As another alternative, the target object may be a target object that is selected to be tossed or moved as part of a stir routine.

At block 128, controller 74 executes program instructions to determine a pre-pick target for the target object 104. In one form, the pre-pick target is a target location wherein a predetermined plane of end effector 92 (e.g., an XY plane defined by the bottom surface of the grid of suction cups 102 of vacuum gripper 94) is parallel to a predetermined plane of the target object 104; wherein predetermined axis of end effector 92 is coincident with a predetermined axis of target object 104; and wherein the predetermined plane of end effector 92 is offset along the predetermined axis of the end effector 92 and the predetermined axis of the target object 104 e.g., anywhere from a millimeter to a few inches in some embodiments. The predetermined planes and predetermined axes may vary with the needs of the application. The offset may vary with the needs of the application, and may be outside the mentioned range. In one form, the predetermined plane of end effector 92 is the XY plane of end effector 92; the predetermined plane of the target object 104 is the X'Y' plane of the target object; and the offset is along the Z axis of end effector 92 and/or the Z' axis of the target object 104. For example, the pre-pick target is a target location wherein the XY plane of end effector 92 is parallel to and offset from the X'Y' plane of target object 104 along the Z and/or Z' axes in a direction away from target object 104. In one example, the Z axis of end effector 92 passes through the center of end effector 92, e.g., through the center of the grid of suction cups 102, and the Z' axis of the target object 104 passes through the center of the target object 104.

At block 130, controller 74 executes program instructions to determine whether the pre-pick target is reachable by end effector 92. For example, in one form, the determination includes assessing whether rotation about each of the robot 72 axes necessary to orient end effector 92 at the pre-pick location are achievable, e.g., within the mechanical limits of the ability of robot 72 and/or within other constraints. For example, in some situations, spatial constraints of robot 72 and/or its environment and/or bin 80 may limit the motion of robot 72 and prevent it from reaching the pre-pick target. In some situations, the target object 104 may be oriented in a way that makes it unreachable by robot 72. If the pre-pick target is not reachable, process flow proceeds to block 192. Otherwise, if the pre-pick target is reachable, process flow proceeds to block 194.

At block 132, controller 74 executes program instructions to obtain a new target object, e.g., by requesting a new target object 104 from vision system 76. In some embodiments, a stir routine may be performed, e.g., by agitating or mixing the objects 104 in bin 80 prior to requesting a new target object 104. After requesting the new target object, process flow proceeds to block 126, where the new target object 104 is returned to controller 74 from vision system 76.

At block 134, controller 74 executes program instructions to determine a pick target for the target object 104. In one form, the pick target is a target location wherein a predetermined plane of end effector 92 (e.g., vacuum gripper 94) coincides with a predetermined plane of the target object 104. For example, the pick target may be a location wherein the XY plane of end effector 92, defined at the bottoms of suction cups 102, coincides with the X'Y' plane of target object 104. In some embodiments, the pick target is also a location wherein a predetermined axis of end effector 92 is coincident with a predetermined axis of target object 104, e.g., wherein the Z axis of end effector 92, e.g., an axis passing through the center of the group of suction cups 102 and end effector 92, is coincident with the Z' axis of target object 104, e.g., an axis passing through the center of the target object 104. The predetermined planes and predetermined axes may vary with the needs of the application.

At block 136 controller 74 executes program instructions to determine whether the pick target is reachable by end effector 92. For example, in one form, the determination includes assessing whether rotation about each of the 6 axes of robot 72 necessary to orient end effector 92 at the pick location are achievable, e.g., within the mechanical limits of the ability of robot 72, and in some embodiments also within other constraints. For example, in some situations, spatial constraints of robot 72 and/or its environment and/or bin 80 may limit the motion of robot 72 and prevent it from reaching the pick target. In some situations, the target object 104 may be oriented in a way that makes it unreachable by robot 72. If the pick target is not reachable, process flow proceeds to block 192. Otherwise, if the pick target is reachable, process flow proceeds to block 138.

At block 138, controller 134 executes program instructions to perform a pick routine, e.g., to pick target object 104 from bin 80 and deposit it onto flipper conveyor 78; to pick target 104 from bin 80 and move or toss it to change its orientation in response to a determination that target 104 is on its side, or to pick target 104 from bin 80 and move or toss it as part of a stir routine. Process flow for the reachability check ends at block 140 after initiation of the pick routine.

By executing a reachability determination to determine whether a pre-pick target and a pick target is achievable, e.g., as described hereinabove, embodiments of the present invention may prevent robot 72 from moving to an unreachable target and generating an error, reducing the need for operator intervention, and in some embodiments, saving the time associated with attempting to reach an unreachable target, thus increasing throughput of the robotic cell.

Embodiments of the present invention include a method for operating a robot, comprising: providing target data for a target object to a robotic controller; determining whether a pre-pick target for the target object is reachable by the robot; determining whether a pick target is reachable by the robot; and picking up the target object with the robot and depositing the target object at a desired location responsive to a determination that the pre-pick target and the pick target are reachable by the robot.

In a refinement, the method further comprises requesting a new target object responsive to a determination that the pre-pick target is not reachable by the robot.

In another refinement, the method further comprises requesting a new target object responsive to a determination that the pick target is not reachable by the robot.

In yet another refinement, the method further comprises determining a pre-pick target and determining a pick target.

In still another refinement, the target data includes a score for the target object.

In yet still another refinement, the target data includes, X, Y and Z axis data for the target object.

Embodiments of the present invention include a method for operating a robot, comprising: designating a target object in a bin; transmitting target data for the target object to a robot controller; determining whether a pre-pick target for the target object is reachable by the robot; determining whether a pick target for the target object is reachable by the robot; and picking up the target object from the bin with the robot if both the pre-pick target and the pick target are reachable by the robot.

In a refinement, the method further comprises depositing the target robot at a desired location.

In another refinement, depositing the target object at a desired location includes depositing the target onto a flipper conveyor system.

In yet another refinement, the method further comprises determining a pre-pick target, wherein the pre-pick target is a target location wherein a first predetermined plane of an end effector of the robot is parallel to a second predetermined plane of the target object, and offset from the second predetermined plane along a predetermined axis.

In still another refinement, the first predetermined plane is an XY plane of the end effector; wherein the second predetermined plane is an X'Y' plane of the target object, and wherein the predetermined axis is a Z axis of the end effector and/or a Z' axis of the target object.

In yet still another refinement, the method further comprises determining a pick target, wherein the pick target is a target location wherein a first predetermined plane of an end effector of the robot coincides with a second predetermined plane of the target object.

In a further refinement, the first predetermined plane is an XY plane of the end effector; and wherein the second predetermined plane is an X'Y' plane of the target object.

In a yet further refinement, the pick target is a target location wherein a Z axis of the end effector is coincident with a Z' axis of the target object.

Referring to FIG. 7, in some situations, an object 104 may be deposited into bin 80, e.g., by an infeed conveyor, after robot 72 begins moving to pick a target object 104 from bin 80, for example, without robotic controller 74 knowing that the object 104 has been so placed. For example, a new object 104 may be dropped into bin 80 after an image of bin 80 was taken, but before robot 72 picks the object from the bin. The new object may interfere with the movement of robot 72 during the picking operation, or may cause a shift in the other objects 104 located in bin 80 such that one of the other objects 104 interferes with robot 80. Because the new object 104 was dropped into bin 80 after the image was taken for the current picking operation, or after the target object 104 was designated (and in some cases, potentially before the target object 104 was analyzed and scored, and/or reachability check performed), robot 72 is not aware of the new object 104 or of the shift in other objects 104 in bin 80. Robot 72 may thus collide with the new object 104 or one of the other objects 104 while moving to pick up the target object 104.

FIG. 7 illustrates some aspects of a method of operating robot 72 that includes a method for performing auto-crash recovery. For example, with typical robotic systems, once a collision occurs, e.g., where the robot collides unintentionally with an object, the robot's motion is immediately stopped or potentially reversed and then stopped as a matter of safety, to prevent damage to a person and/or object and/or the robot. In many cases, this includes stoppage of the robot's control algorithms. This stoppage may be referred to as a crash, e.g., of the robot's control algorithms, and in conventional robotic systems, requires operator involvement or intervention to rectify the situation. The auto-crash recovery method of FIG. 7 functions to direct the operations of controller 74 and robot 72 after a collision, and to recover operation of controller 74 and robot 72 after the collision, without requiring operator involvement or intervention, e.g., depending upon the cause of the crash in some embodiments. Some aspects of the auto-crash recovery procedure are illustrated with a flowchart 150 of FIG. 7. Initially, prior to block 152 in flowchart 150, controller 74 is executing instructions of a robotic control program to perform an action with robot 72, e.g., to pick a target object from bin 80. In one form, a collision of robot 72 occurs while end effector 92 is in bin 80 attempting to pick up a target object from bin 80. Controller 74 executes program instructions to implement the method of blocks 152, 154 and 160 to 172 to recover the robot and resume normal operation without human involvement or intervention.

At block 152, controller 74 executes program instructions to determine that the robot 72 control program executing on controller 74 is stopped. In some embodiments, controller 74 executes program instructions to stop the robot control program. For example, the robot control program may be stopped by controller 74 due to a collision of robot 72. Controller 74 may execute program instructions to detect the collision, for example, prior to stopping execution of the robot control program, e.g., by monitoring the torque for each robot 72 axis. When the torque exceeds an expected value by a predetermined margin or tolerance value, e.g., an expected value for the particular operation being performed by robot 72, controller 74 determines that a collision has taken place. In some embodiments, the torque determination may be made, for example, based on torque sensors for one or more rotational axes of robot 72, e.g., one or more of the 6 axes of robot 72, based on drive motor current, and/or based on other measurements related to robot 72 motion, e.g., including force sensors or motor/winding temperature in some embodiments.

At block 154, controller 74 executes program instructions to determine whether the cause of the stoppage is a motion supervision error. A collision of robot 72 with an intervening person, object or other physical structure is an example of a motion supervision error. If not, process flow proceeds to block 156, where it is determined that the cause of the stoppage is due to other issues, e.g., unrelated to a motion supervision error. Process flow then proceeds to block 158, wherein the other issue(s) is resolved, and measures are taken to resume normal operation of controller 74 and robot 72. If the cause is determined to be a motion supervision error, process flow proceeds to block 160.

At block 160, controller 74 executes program instructions to set a crash flag. In some embodiments, the crash flag is set in response to determining that the cause of the stoppage is a collision of robot 72, or in some embodiments, in response to detecting that a collision has occurred. A set crash flag indicates to programs and subroutines being executed on controller 74 that a collision of robot 72 has occurred. Process flow then proceeds to block 162.

At block 162, controller 74 executes program instructions to restart the robot. In some embodiments, this may include restarting the robot control program execution on controller 74. In some embodiments, the set crash flag is read by controller 74, and the next actions are performed based on the crash flag having been set.

At block 164, controller 74 executes program instructions to direct robot 72 to move out of bin 80.

At block 166, controller 74 executes program instructions to direct robot 72 to move to a home position.

At block 168, controller 74 executes program instructions to request a new target object 104 from vision system 76.

At block 170, vision system 76 executes program instructions to return a new target object 104 to controller 74 in response to the request at block 168. The target object has been analyzed and scored, and the target data sent to controller 164.

At block 172, controller 74 executes program instructions to resume normal operation of robot 72 under the direction of the robot control program.

By executing an auto-crash recovery program to recover a robot from a collision and then resume normal robotic operation, e.g., as described hereinabove, embodiments of the present invention reduce the need for operator involvement or intervention, and increase throughput of the robotic cell.

Embodiments of the present invention include a method for operating a robot, comprising: executing program instructions to determine that a robotic control program being executed on a robotic controller to operate the robot has been stopped; executing program instructions to determine whether a cause of the stoppage is a motion supervision error; executing program instructions to request a new target object from a vision system; and executing program instructions to resume normal robotic operation using the robotic control program.

In a refinement, the motion supervision error is a collision of the robot.

In another refinement, the method further comprises executing program instructions to set a crash flag responsive to a determination that the cause of the stoppage is a collision of the robot.

In yet another refinement, the method further comprises executing program instructions to restart the robot after the detection of the collision of the robot.

In still another refinement, the collision occurred in a picking bin, further comprising executing program instructions to move the robot out of a bin prior to resuming normal operation.

In yet still another refinement, the method further comprises executing program instructions to move the robot to a home position prior to resuming normal operation.

In a further refinement, the method further comprises executing program instructions to direct the vision system to return the new target object to the robotic controller in response to executing the program instructions to request the new target object.

In a yet further refinement, the program instructions to determine that the robotic control program has been stopped, determine whether the cause of the stoppage is the motion supervision error, request the new target object from the vision system, and resume the normal robotic operation are executed without human intervention.

Embodiments of the present invention include a method for operating a robot, comprising: executing program instructions of a robotic control program to perform an action with the robot; executing program instructions to detect a collision of the robot; executing program instructions to stop the execution of the robot control program; executing program instructions to set a crash flag; executing program instructions to request a new target object from a vision system; and executing program instructions to resume normal robotic operation using the robotic control program.

In a refinement, the method further comprises executing program instructions to restart the robotic control program after the detection of the collision of the robot.

In another refinement, the collision occurred in a picking bin, further comprising executing program instructions to move the robot out of a bin prior to resuming normal operation.

In yet another refinement, the method further comprises executing program instructions to move the robot to a home position prior to resuming normal operation.

In still another refinement, the method further comprises executing program instructions to direct the vision system to return the new target object to the robotic controller in response to executing the program instructions to request the new target object.

In yet still another refinement, the program instructions to detect a collision of the robot; stop the execution of the robot control program; set a crash flag; request a new target object from a vision system; and resume normal robotic operation using the robotic control program are all executed without human intervention.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

While preferred embodiments of the inventions have been described, it should be understood that the inventions are not so limited, and modifications may be made without departing from the inventions herein. While each embodiment described herein may refer only to certain features and may not specifically refer to every feature described with respect to other embodiments, it should be recognized that the features described herein are interchangeable unless described otherwise, even where no reference is made to a specific feature. It should also be understood that the advantages described above are not necessarily the only advantages of the inventions, and it is not necessarily expected that all of the described advantages will be achieved with every embodiment of the inventions. The scope of the inventions is defined by the appended claims, and all devices and methods that come within the meaning of the claims, either literally or by equivalence, are intended to be embraced therein.

The invention claimed is:

1. A method of robotically grasping an object, comprising:
    imaging a first area within a workspace of the robot, the workspace containing multiple objects of random sizes and random locations and comprising a ramped surface;
    determining a first score for the first area, the first score corresponding to a likelihood that a first object is graspable;
    grasping the first object if the first score is above a first threshold and moving the first object to an output station; and
    moving one or more objects in the workspace to change a position of objects in the workspace without moving the one or more objects to the output station;
    wherein the step of moving the one or more objects in the workspace comprises grasping one of the objects with an end effector of the robot, moving the end effector and the object upward along the ramped surface, and releasing the object from the end effector at a height on the ramped surface higher than where the object was grasped, the object sliding on the ramped surface after being released by the robot and thereby pushing into the objects in the workspace to move the one or more objects.

2. The method according to claim 1, wherein prior to the step of moving the one or more objects in the workspace, if the first score is below the first threshold, the method further comprises:
    imaging a second area within the workspace of the robot;
    determining a second score for the second area, the second score corresponding to a likelihood that a second object is graspable; and
    grasping the second object if the second score is above a second threshold and moving the second object to the output station.

3. The method according to claim 2, wherein prior to the step of moving the one or more objects in the workspace, if the second score is below the second threshold, the method further comprises:
    imaging a third area within the workspace of the robot;
    determining a third score for the third area, the third score corresponding to a likelihood that a third object is graspable; and
    grasping the third object if the third score is above a third threshold and moving the third object to the output station.

4. The method according to claim 3, wherein the first threshold, the second threshold and the third threshold are the same.

5. The method according to claim 3, wherein the step of moving the one or more objects in the workspace is performed if the third score is below the third threshold prior to moving an object in the workspace to the output station.

6. The method according to claim 5, wherein the robot grasps the third object and moves the third object to perform the step of moving the one or more objects in the workspace.

7. The method according to claim 1, wherein the step of moving the one or more objects in the workspace is performed if the first score is below the first threshold prior to moving an object in the workspace to the output station.

8. The method according to claim 7, wherein the robot grasps the first object and moves the first object to perform the step of moving the one or more objects in the workspace if the first score is below the first threshold.

9. The method according to claim 1, wherein the multiple objects in the workspace are rectangular shipping packages with each having at least one flat surface larger than edge surfaces, the first score corresponding to a likelihood that the at least one flat surface of a shipping package is graspable.

10. The method according to claim 1, wherein the first object is grasped with one or more vacuum cups.

11. The method according to claim 1, wherein the first object is separated from other objects on the output station.

12. The method according to claim 1, wherein the end effector of the robot moves to the first object in the step of grasping the first object at a first speed, and the end effector moves to one of the objects in the step of moving the one or more objects in the workspace at a second speed, the second speed being slower than the first speed.

13. The method according to claim 1, wherein the step of moving the one or more objects in the workspace comprises grasping one of the objects with the end effector of the robot, moving the object with the end effector, and releasing the object from the end effector while the end effector is moving, the object thereby being tossed to a new location in the workspace.

14. The method according to claim 13, wherein the end effector is moving at an accelerating speed when the object is released from the end effector.

15. The method according to claim 1, wherein an infeed conveyor is disposed at a top of the ramped surface, the multiple objects being fed into the workspace from the infeed conveyor at the top of the ramped surface.

16. The method according to claim 1, wherein the step of grasping the first object comprises:
    determining an orientation and a location of the first object using imaged surfaces of the first object;
    determining motions of the robot based upon the orientation and location to grasp the first object with the end effector of the robot, wherein the motions include a rotation movement and the rotation movement is retained within a predefined angular range; and
    moving the robot using the determined motions and grasping the first object.

17. The method according to claim 1, wherein the step of grasping the first object comprises:
    determining whether a pre-pick target for the first object is reachable by the robot;
    determining whether a pick target for the first object is reachable by the robot; and grasping the first object with the robot and moving the first object to the output station responsive to a determination that the pre-pick target and the pick target are reachable by the robot.

18. The method according to claim 1, further comprising:
determining that a robotic control program being executed on a robotic controller to operate the robot has been stopped;
determining whether a cause of the stoppage is a motion supervision error;
requesting a new target object from a vision system; and
resuming normal robotic operation using the robotic control program.

19. The method according to claim 1, further comprising:
performing an action with the robot by executing a robotic control program;
detecting a collision of the robot;
stopping the execution of the robot control program;
setting a crash flag;
requesting a new target object from a vision system; and
resuming normal robotic operation using the robotic control program.

20. A method of robotically grasping an object, comprising:
imaging a first area within a workspace of the robot, the workspace containing multiple objects of random sizes and random locations;
determining a first score for the first area, the first score corresponding to a likelihood that a first object is graspable;
grasping the first object if the first score is above a first threshold and moving the first object to an output station; and
moving one or more objects in the workspace to change a position of objects in the workspace without moving the one or more objects to the output station;
wherein the step of moving the one or more objects in the workspace comprises grasping one of the objects with an end effector of the robot, moving the object with the end effector, and releasing the object from the end effector while the end effector is moving, the object thereby being tossed to a new location in the workspace.

* * * * *